United States Patent [19]

Takanashi et al.

[11] Patent Number: 4,757,376
[45] Date of Patent: Jul. 12, 1988

[54] COLOR TELEVISION IMAGE PICKUP DEVICE WITH A STRIPE FILTER PARALLEL TO SCANNING DIRECTION

[75] Inventors: Itsuo Takanashi, Kamakura; Shintaro Nakagaki, Fujisawa; Hiroshi Ichimura; Takashi Kuriyama, both of Tokyo; Tsutou Asakura, Yokohama; Hiroki Kitamura, Tokyo, all of Japan

[73] Assignee: Victor Company of Japan, Ltd., Japan

[21] Appl. No.: 875,349

[22] Filed: Jun. 17, 1986

[30] Foreign Application Priority Data

Jun. 27, 1985 [JP] Japan .................................. 60-141324
Jul. 8, 1985 [JP] Japan .................................. 60-148252
Jul. 9, 1985 [JP] Japan .................................. 60-150887
Jul. 17, 1985 [JP] Japan .................................. 60-157904

[51] Int. Cl.$^4$ .......................... H04N 9/07; H04N 9/083
[52] U.S. Cl. ........................................ 358/47; 358/44; 358/55
[58] Field of Search .................... 358/41, 43, 44, 909, 358/45, 46, 68, 55, 47

[56] References Cited

U.S. PATENT DOCUMENTS

| 3,763,480 | 10/1973 | Weimer | 340/173 |
| 3,846,579 | 11/1974 | Takanashi et al. | 358/47 |
| 3,858,079 | 12/1974 | Miyama et al. | 358/43 |
| 4,318,123 | 3/1982 | Knop | 358/43 |
| 4,578,699 | 3/1986 | Takanashi et al. | 358/44 |
| 4,614,966 | 9/1986 | Yunoki et al. | 358/41 |

Primary Examiner—James J. Groody
Assistant Examiner—Robert M. Bauer
Attorney, Agent, or Firm—Andrus, Sceales, Starke & Sawall

[57] ABSTRACT

A color image pickup device comprises an image pickup tube, a color stripe filter comprising a plurality of stripe groups each having a plurality of stripes, and a circuit for obtaining a color multiplexed signal by multiplexing color components obtained via the color stripe filter in a direction perpendicular to the scanning direction for every one stripe group. The color stripe filter is arranged on the image pickup tube so that a longitudinal direction of the stripes of the color stripe filter is substantially parallel to a scanning direction of the image pickup tube. A color demodulated signal and/or a luminance signal are/is produced from the color multiplexed signal.

18 Claims, 5 Drawing Sheets

COLOR TELEVISION IMAGE PICKUP DEVICE WITH A STRIPE FILTER PARALLEL TO SCANNING DIRECTION

BACKGROUND OF THE INVENTION

The present invention generally relates to color image pickup devices, and more particularly to a color image pickup device which obtains a color multiplexed signal from a pickup tube provided with a color stripe filter and performs a color demodulation in a single tube color television camera, for example.

In a conventional single tube color television camera, a color multiplexed signal is obtained by performing a scan in a direction perpendicular to the longitudinal direction of stripes of a color stripe filter which comprises a repetition of green (G), cyan (C) and white (W or transparent) stripes.

However, because the scanning is performed in the direction perpendicular to the longitudinal direction of the stripes of the color stripe filter, color components obtained via the color stripe filter are multiplexed by a carrier of 4 MHz which is relatively high for one period of the color stripe filter (that is, for one group of the G, C and W stripes). Generally, noise is high in the high frequency range, and the degree of modulation of the image pickup tube is low in the high frequency range. As a result, the signal-to-noise ratio becomes poor. In addition, the image pickup tube cannot reproduce color stripes with a high fidelity, and there is a problem in that the color reproducibility is poor.

Furthermore, since the scanning is performed in the direction perpendicular to the longitudinal direction of the stripes of the color stripe filter, the color components obtained via the color stripe filter are multiplexed in a sequence corresponding to the scanning direction. For this reason, the frequency band of the luminance signal becomes limited to a narrow frequency band by the color multiplexed signal (carrier), and there is a problem in that it is impossible to obtain a satisfactory horizontal resolution.

SUMMARY OF THE INVENTION

Accordingly, it is a general object of the present invention to provide a novel and useful color image pickup device in which the problems described heretofore are eliminated.

Another and more specific object of the present invention is to provide a color image pickup device in which color components are multiplexed by a carrier having a relatively low carrier frequency. According to the color image pickup device of the present invention, it is possible to obtain a high signal-to-noise ratio and to obtain a satisfactory color reproducibility. In addition, it is possible to have a wide frequency band for the luminance signal and to obtain a satisfactory horizontal resolution.

Still another object of the present invention is to provide a color image pickup device in which sampled data are written into and read out from a memory device for every one horizontal scanning period of the NTSC system. According to the color image pickup device of the present invention, it is unnecessary to provide special means for dividing the sampled data read out from the memory device into a data group for every one horizontal scanning period. Furthermore, the memory capacity of the memory device does not need to be extremely large.

A further object of the present invention is to provide a color image pickup device which can accurately pickup an image of an object the brightness of which gradually becomes brighter (or darker) in the vertical direction. According to the color image pickup device of the present invention, it is possible to accurately reproduce the colors even when the brightness of the object gradually becomes brighter (or darker) in the vertical direction.

Other objects and further features of the present invention will be apparent from the following detailed description when read in conjunction with the accompanying drawings.

DETAILED DESCRIPTION

Figure 1:
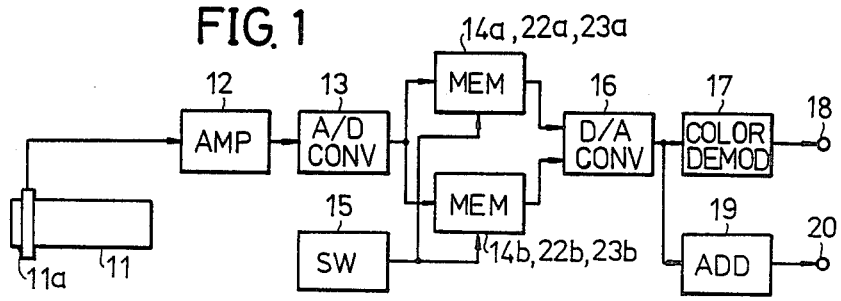
FIG. 1 is a system block diagram for explaining first through third embodiments of the color image pickup device according to the present invention.
Figure 2:
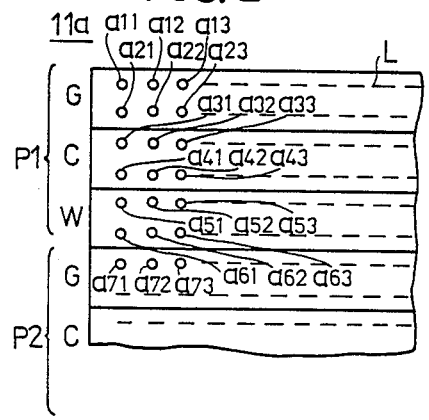
FIG. 2 is a diagram showing a portion of a color stripe filter used in the first embodiment and sampling points.

FIG. 1 shows a first embodiment of the color image pickup device according to the present invention, and FIG. 2 shows a portion of a color stripe filter used in the first embodiment for explaining the relationship between scanning lines and sampling positions.

As shown in FIG. 2, a color stripe filter 11a comprises a repetition of green (G), cyan (C) and white (W or transparent) stripes. In the present embodiment, the color image pickup device performs the scanning in a longitudinal direction of the stripes of the color stripe filter 11a. A number of scanning lines L is set to such a number that the color stripe filter 11a can reproduce the samples. For example, the number of scanning lines L for stripe group consisting of the G, C and W stripes is set to six. According to the energy step system, a fundamental wave component and a second harmonic component are to be reproduced. Thus, it may be understood from the sampling theorem that it is possible to reproduce the fundamental wave component and the second harmonic component when there are four or more scanning lines L per one stripe group.

In FIG. 1, a signal obtained from an image pickup tube 11 which is provided with the color stripe filter 11a shown in FIG. 2 is passed through a preamplifier 12 and is supplied to an analog-to-digital (A/D) converter 13 wherein the signal is converted into a digital signal. The output digital signal of the A/D converter 13 is supplied to field memories 14a and 14b. A control signal is supplied to the memories 14a and 14b from a switching circuit 15 so as to control write-in and read-out operations of the memories 14a and 14b.

Figure 3A:
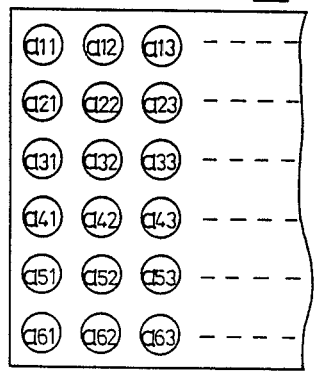
FIGS. 3A and 3B are diagrams for explaining a write-in operation to a memory in the first embodiment.
Figure 3B:
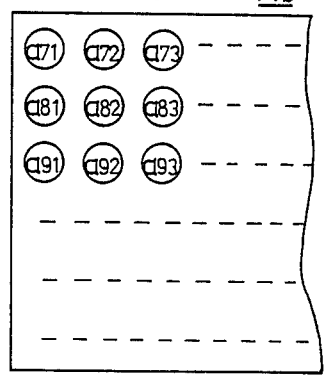

One period of the stripe groups of the color stripe filter 11a is set to correspond to one horizontal scanning period of the NTSC system. In a first horizontal scanning period, a signal from the A/D converter 13 related to a first stripe group P1 is written into the memory 14a as shown in FIG. 3A in a sequence of sampled data at sampling points a11, a12, a13, ..., a21, a22, a23, ..., a31, a32, a33, ... shown in FIG. 2. In other words, the sampled data related to the first stripe group P1 are successively written into the memory 14a in the sequence of the sampled data arranged in the horizontal direction. In a second horizontal scanning period, the stored sampled data related to the first stripe group P1 are successively read out from the memory 14a in a sequence of the sampled data at the sampling points a11, a21, a31, a41, a51, a61, a12, a22, a32, a42, a52, a62, a13, a23, a33, a43, a53, a63, .... In other words, the stored sampled data are read out from the memory 14a in the sequence of the stored sampled data arranged in a direction perpendicular to the write-in direction. On the other hand, in the second horizontal scanning period, a signal from the A/D converter 13 related to a second stripe group P2 is written into the memory 14b as shown in FIG. 3B in a sequence of sampled data at sampling points a71, a72, a73, ..., a81, a82, a83, ..., a91, a92, a93, ..., similarly as in the case of the write-in to the memory 14a in the first horizontal scanning period.

In a third horizontal scanning period, the stored sampled data related to the second stripe group P2 are successively read out from the memory 14b in a sequence of the sampled data at the sampling points a71, a81, a91, ..., a72, a82, a92, ..., a73, a83, a93, .... In other words, the stored sampled data are read out from the memory 14b in the sequence of the stored sampled data arranged in a direction perpendicular to the write-in direction. Furthermore, in this third horizontal scanning period, a signal from the A/D converter 13 related to a third stripe group is newly written into the memory 14a.

Similarly thereafter, the write-in and read-out operations are alternately performed in the memories 14a and 14b for the signal related to each stripe group, and such operations are repeated. As a result, the write-in and read-out operations are performed for each stripe group, that is, for each horizontal scanning period. The signals read out from the memories 14a and 14b for every one horizontal scanning period of the NTSC system are supplied to a digital-to-analog (D/A) converter 16 wherein the signals are converted into an analog signal.

Figure 14:
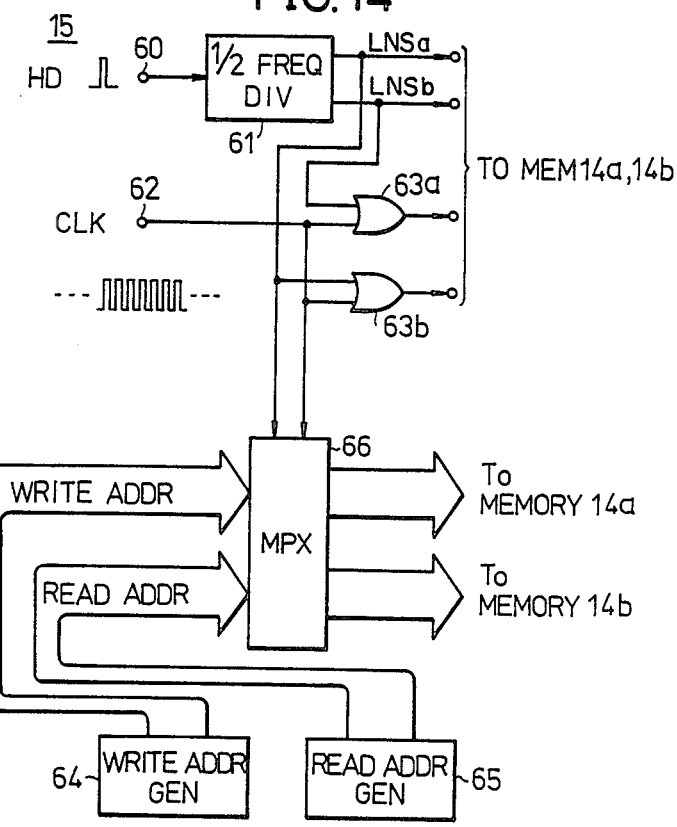
FIG. 14 is a system circuit diagram showing an embodiment of a switching circuit within the color image pickup device according to the present invention.
Figure 15:
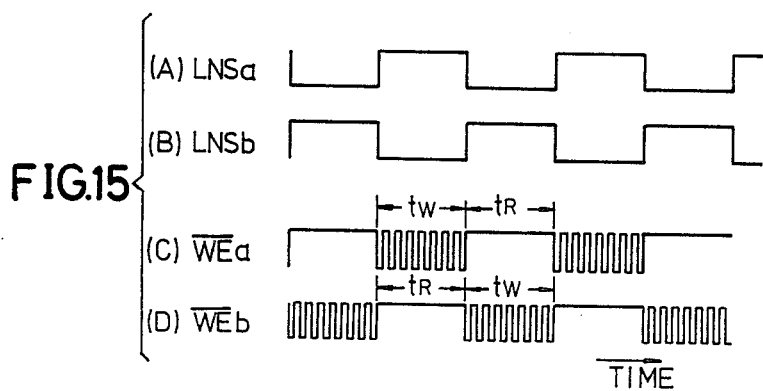
FIGS. 15(A) through 15(D) show signal waveforms for explaining the operation of the circuit system shown in FIG. 14.

An embodiment of the switching circuit 15 is shown in FIG. 14. In FIG. 14, a horizontal synchronizing signal HD is applied to a terminal 60 and is supplied to a $\frac{1}{2}$ frequency divider 61 wherein the signal is frequency-divided by $\frac{1}{2}$. As a result, signals LNSa and LNSb shown in FIGS. 15(A) and 15(B) are obtained from the frequency divider 61. On the other hand, a clock signal CLK is applied to a terminal 62 is supplied to OR gates 63a and 63b which are respectively supplied with the signals LNSa and LNSb. Hence, write-in and read-out control signals $\overline{WEa}$ and $\overline{WEb}$ shown in FIGS. 15(C) and 15(D) are obtained from the OR gates 63a and 63b.

A write-in address generated by a write-in address generator 64 and a read-out address generated by a read-out address generator 65 are supplied to a multiplexer 66. This multiplexer 66 is also supplied with the output signals LNSa and LNSb of the frequency divider 61. Hence, the multiplexer 66 alternately produces the write-in address and the read-out address with a period of one horizontal scanning period, in synchronism with the timing of the signal LNSa, for example. The output address of the multiplexer 66 is supplied to the memories 14a and 14b.

Accordingly, during a time period $t_W$ shown in FIG. 15(C), for example, the memory 14a performs a write-in operation responsive to the control signal $\overline{WEa}$ to write data at a write-in address. During a next time period $t_R$ shown in FIG. 15(C), the memory 14a performs a read-out operation responsive to the control signal $\overline{WEb}$ to read out stored data from a read-out address. The memory 14a alternately performs the write-in operation and the read-out operation for every one horizontal scanning period, and such write-in and read-out operations are repeated. On the other hand, the memory 14b performs the write-in and read-out operations similarly as in the case of the memory 14a, except that the memory 14b performs the read-out operation while the memory 14a performs the write-in operation and performs the write-in operation while the memory 14a performs the read-out operation.

The signals LNSa and LNSb from the frequency divider 61 are also supplied to data latch circuits (not shown) which are respectively provided at input and output stages of the memories 14a and 14b, so as to control the timings of input and output data of the memories 14a and 14b to regular timings.

Figure 4A:
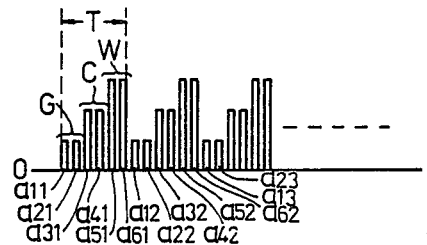
FIGS. 4A and 4B respectively show an input signal waveform to a color demodulating circuit in the color image pickup device according to the present invention and a luminance signal waveform.

The output signal of the D/A converter 16 comprises the data of each stripe group arranged on the time base as shown in FIG. 4A. This signal shown in FIG. 4A is similar to a color multiplexed signal obtained in accordance with the general energy step system. When the sampling theorem is satisfied, the output signal of the D/A converter 16 becomes similar to the color multiplexed signal obtained by multiplexing the color components according to the energy step system, and it is possible to reproduce a fundamental wave component signal and a second harmonic wave component signal with a high fidelity even when the sampling phase and frequency change.

The output signal of the D/A converter 16 is supplied to a color demodulating circuit 17 which has a construction similar to a color demodulating circuit used in the case of the energy step system, and is subjected to a color demodulation. An output signal of the color demodulating circuit 17 is obtained via an output terminal 18.

Figure 4B:
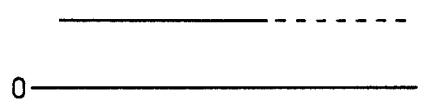

On the other hand, the output signal of the D/A converter 16 is also supplied to an adder 19 wherein the data of one stripe group are added for each of the stripe groups, and a luminance signal shown in FIG. 4B is produced from the adder 19. The output luminance signal of the adder 19 is obtained via an output terminal 20.

According to the present embodiment, the scanning is performed in the longitudinal direction of the stripes of the color stripe filter 11a. For this reason, the color components are multiplexed by a carrier having a frequency of 94.5 kHz (=fundamental wave component frequency of 15.75 kHz×6) which is relatively low for one period (corresponding to one horizontal scanning period of the NTSC system) of the stripe group comprising the G, C and W stripes. As a result, the signal-to-noise ratio is high. In addition, the image pickup tube can reproduce the color stripes with a high fidelity, and the color reproducibility is satisfactory.

Furthermore, since the scanning is performed in the longitudinal direction of the stripes of the color stripe filter 11a, the color components obtained via the color stripe filter 11a are not multiplexed in a sequence corresponding to the horizontal direction (scanning direction). For this reason, it is possible to obtain the same resolution as in the case of a black-and-white picture, and the frequency band of the luminance signal will not be limited by the color multiplexed signal (carrier). The frequency band of the luminance signal can be made wide, and it is possible to obtain a satisfactory horizontal resolution.

In the present embodiment, the color stripe filter 11a comprises 240 stripe groups (corresponding to one field of the NTSC system). When it is assumed that the vertical resolution for one stripe group is two television scanning lines, the vertical resolution as a whole is 480 television scanning lines, and the vertical resolution is the same as that of the conventional image pickup device.

In the case where the image pickup tube is designed to scan in the vertical direction, the color stripe filter should be arranged so that longitudinal direction of the stripes of the color stripe filter coincides with the vertical direction. In this case, the write-in to the memories 14a and 14b is performed in a sequence of the data arranged in the vertical direction and the read-out from the memories 14a and 14b is performed in a direction perpendicular to the write-in direction, that is, in the horizontal direction.

In addition, according to the present embodiment, the color multiplexed signal is obtained for each of the stripe groups arranged in the direction perpendicular to the scanning direction. For this reason, the sampled data can be written into and read out from the memories for every one horizontal scanning period of the NTSC system, and it is unnecessary to provide special means for dividing the sampled data read out from the memories into a data group for every one horizontal scanning period. Consequently, the memory capacities of the memories do not need to be extremely large.

Figure 13:
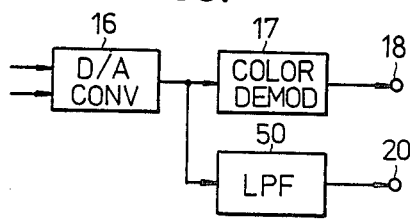
FIG. 13 is a system block diagram showing a first modification of the first embodiment.

In the present embodiment, the luminance signal is obtained by adding the data of one stripe group for each of the stripe groups, so as to eliminate the luminance difference introduced by the color stripe filter 11a. However, the luminance signal may be obtained by using a lowpass filter instead of the adder 19 so as to cut off frequencies over a predetermined frequency determined by the period T of the stripe groups shown in FIG. 4A. FIG. 13 shows an essential part of a modification of the first embodiment in which a lowpass filter 50 is used instead of the adder 19. In FIG. 13, those parts which are the same as those corresponding parts in FIG. 1 are designated by the same reference numerals, and description thereof will be omitted.

Figure 5:
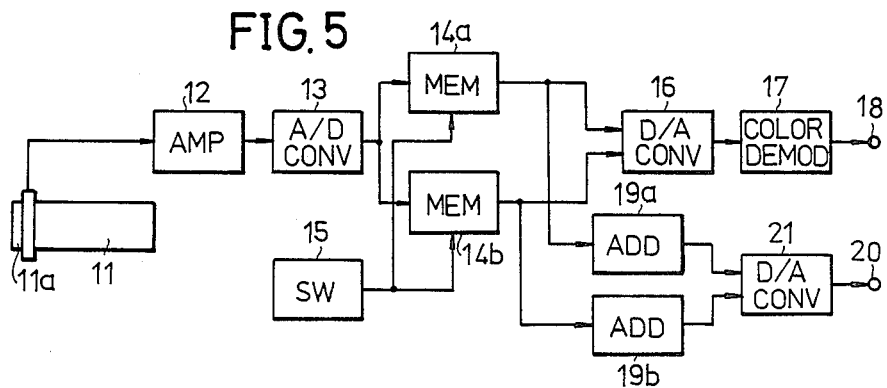
FIG. 5 is a system block diagram showing a second modification of the first embodiment.

FIG. 5 shows a second modification of the first embodiment, wherein the luminance signal is obtained differently from the first embodiment and the first modification thereof. In FIG. 5, those parts which are the same as those corresponding parts in FIG. 1 are designated by the same reference numerals, and description thereof will be omitted. In FIG. 5, the output signals of the memories 14a and 14b are supplied to respective adders 19a and 19b wherein the data of one stripe group are added for each of the stripe groups, and output signals of the adders 19a and 19b are converted into a luminance signal in a D/A converter 21. The output luminance signal of the D/A converter 21 is obtained via an output terminal 20.

In the case of the second modification, when it is assumed that there are n scanning lines per one stripe group of the color stripe filter 11a, it is possible to obtain a noise improvement of $(n)^{\frac{1}{2}}$ for the luminance signal.

Figure 6:
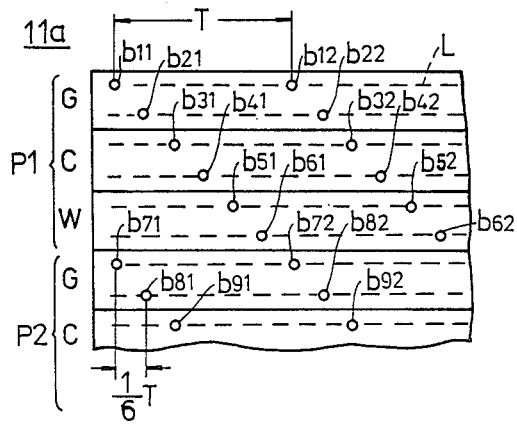
FIG. 6 is a diagram showing a portion of a color stripe filter used in the second embodiment and sampling points.

FIG. 6 shows a portion of a color stripe filter used in a second embodiment of the color image pickup device according to the present invention for explaining the relationship between scanning lines and sampling positions. As in the case of the first embodiment, the number of scanning lines L for stripe group consisting of the G, C and W stripes is set to six. The block system of the second embodiment is the same as that of the first embodiment shown in FIG. 1.

Figure 7A:
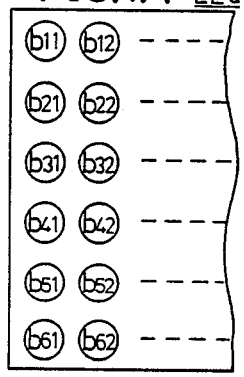
FIGS. 7A and 7B are diagrams for explaining a write-in operation to the memory in the second embodiment.

One period of the stripe groups of the color stripe filter 11a is set to correspond to one horizontal scanning period of the NTSC system. In the first horizontal scanning period, the signal from the A/D converter 13 related to a first stripe group P1 is written into a memory 22a as shown in FIG. 7A in a sequence of sampled data at sampling points b11, b12, ..., b21, b22, ..., b31, b32, ... shown in FIG. 6. In other words, the sampled data related to the first stripe group P1 are successively written into the memory 22a in the sequence of the sampled data arranged in the horizontal direction but with the sampled data decimated in the horizontal direction so that in each scanning line there is an interval T (=sampling period) between two successive sampled data which are written. Hence, in two mutually adjacent scanning lines, there is a difference of T/6 in the horizontal direction between the sampling points of the sampled data which are written into the memory 22a.

Figure 7B:
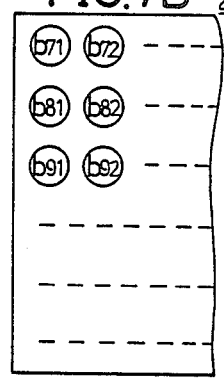

In the second horizontal scanning period, the stored sampled data are successively read out from the memory 22a in a sequence of the stored sampled data b11, b21, b31, b41, b51, b61, b12, b22, b32, b42, b52, b62, .... In other words, the stored sampled data are read out from the memory 22a in a sequence of the stored sampled data arranged in a direction perpendicular to the write-in direction. At the same time, during the second horizontal scanning period, the signal from the A/D converter 13 related to a second stripe group P2 is written into a memory 22b as shown in FIG. 7B in a sequence of sampled data at sampling points b71, b72, ... , b81, b82, ..., b91, b92, ... shown in FIG. 6. In other words, the sampled data related to the second stripe group P2 are successively written into the memory 22b in the sequence of the sampled data arranged in the horizontal direction but with the sampled data decimated in the horizontal direction so that in each scanning line there is an interval T (=sampling period) between two successive sampled data which are written. Hence, in two mutually adjacent scanning lines, there is a difference of T/6 in the horizontal direction between the sampling points of the sampled data which are written into the memory 22b.

In the third horizontal scanning period, the stored sampled data are successively read out from the memory 22b in a sequence of the stored sampled data b71, b81, b91, ..., b72, b82, b92, .... In other words, the stored sampled data are read out from the memory 22b in a sequence of the stored sampled data arranged in a direction perpendicular to the write-in direction. At the same time, during the third horizontal scanning period, the signal from the A/D converter 13 related to a third stripe group is newly written into the memory 22a.

Similarly thereafter, the write-in and read-out operations are alternately performed in the memories 22a and 22b for the signal related to each strip group, and such operations are repeated. As a result, the write-in and read-out operations are performed for each stripe group, that is, for each horizontal scanning period. The signals read out from the memories 22a and 22b for every one horizontal scanning period of the NTSC system are supplied to D/A converter 16 wherein the signals are converted into an analog signal.

The output signal of the D/A converter 16 comprises the data of each stripe group arranged similarly on the time base as in the case of the signal shown in FIG. 4A. This output signal of the D/A converter 16 is similar to the color multiplexed signal obtained in accordance with the general energy step system.

Figure 8:
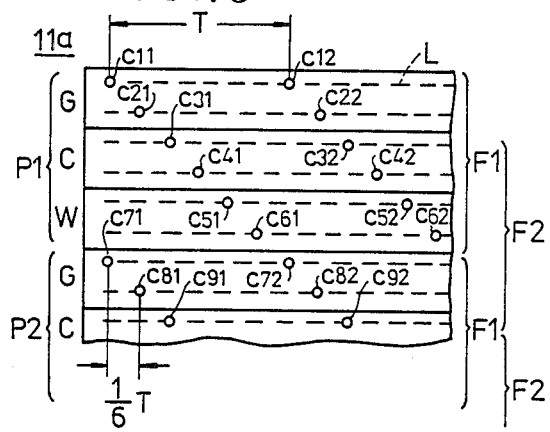
FIG. 8 is a diagram showing a portion of a color stripe filter used in the third embodiment and sampling points.

FIG. 8 shows a portion of a color strip filter used in a third embodiment of the color image pickup device according to the present invention for explaining the relationship between scanning lines and sampling positions. The block system of the third embodiment is the same as that of the first embodiment shown in FIG. 1.

First, description will be given with respect to a first field F1. In the first horizontal scanning period of the first field F1, the signal from the A/D converter 13 related to a first stripe group P1 is written into a memory 23a in a sequence of sampled data at sampling points c11, c12, ..., c21, c22, ..., c31, c32, ... shown in FIG. 8. In other words, the sampled data related to the first strip group P1 are successively written into the memory 23a in the sequence of the sampled data arranged in the horizontal direction but with the sampled data decimated in the horizontal direction so that in each scanning line there is an interval T (=sampling period) between two successive sampled data which are written. Hence, in two mutually adjacent scanning lines, there is a difference of T/6 in the horizontal direction between the sampling points of the sampled data which are written into the memory 23a.

In the second horizontal scanning period of the first field F1, the stored sampled data are successively read out from the memory 23a in a sequence of the stored sampled data c11, c21, c31, c41, c51, c61, c12, c22, c32, c42, c52, c62, .... In other words, the stored sampled data are read out from the memory 23a in a sequence of the stored sampled data arranged in a direction perpendicular to the write-in direction. At the same time, during the second horizontal scanning period, the signal from the A/D converter 13 related to a second strip group P2 is written into a memory 23b in a sequence of sampled data at sampling points c71, c72, ..., c81, c82, ..., c91, c92, ... shown in FIG. 8. In other words, the sampled data related to the second stripe group P2 are successively written into the memory 23b in the sequence of the sampled data arranged in the horizontal direction but with the sampled data decimated in the horizontal direction so that in each scanning line there is an interval T (=sampling period) between two successive sampled data which are written. Hence, in two mutually adjacent scanning lines, there is a difference of T/6 in the horizontal direction between the sampling points of the sampled data which are written into the memory 23b.

In the third horizontal scanning period of the first field F1, the stored sampled data are successively read out from the memory 23b in a sequence of the stored sampled data c71, c81, c91, ..., c72, c82, c92, .... In other words, the stored sampled data are read out from the memory 23b in a sequence of the stored sampled data arranged in a direction perpendicular to the write-in direction. At the same time, during the third horizontal scanning period, the signal from the A/D converter 13 related to a third stripe group is newly written into the memory 23a.

Similarly thereafter, the write-in and read-out operations are alternately performed in the memories 23a and 23b for the signal related to each stripe group, and such operations are repeated. As a result, the write-in and read-out operations are performed for each stripe group, that is, for each horizontal scanning period of the first field F1. The signals read out from the memories 23a and 23b for every one horizontal scanning period of the NTSC system are supplied to D/A converter 16 wherein the signals are converted into an analog signal.

Next, description will be given with respect to a second field F2. In the first horizontal scanning period of the second field F2, the signal from the A/D converter 13 related to the a portion of the first stripe group P1 and a portion of the second stripe group P2 is written into the memory 23a in a sequence of sampled data at sampling points c41, c42, ..., c51, c52, ..., c61, c62, ..., c71, c72, ..., c81, c82, ..., c91, c92, ... shown in FIG. 8. In other words, the sampled data related to the portions of the first and second stripe groups P1 and P2 are successively written into the memory 23a in the sequence of the sampled data arranged in the horizontal direction but with the sampled data decimated in the horizontal direction so that in each scanning line there is an interval T (=sampling period) between two successive sampled data which are written. Hence, in two mutually adjacent scanning lines, there is a difference of T/6 in the horizontal direction between the sampling points of the sampled data which are written into the memory 23a.

In the second horizontal scanning period of the second field F2, the stored sampled data are successively read out from the memory 23a in a sequence of the stored sampled data c41, c51, c61, c71, c81, c91, c42, c52, c62, c72, c82, c92, .... In other words, the stored sampled data are read out from the memory 23a in a sequence of the stored sampled data arranged in a direction perpendicular to the write-in direction. At the same time, during the second horizontal scanning period, the signal from the A/D converter 13 related to a portion of the second stripe group P2 and a portion of the third stripe group is written into the memory 23b in a sequence similar to that of the write-in performed for the first horizontal scanning period of the second field F2.

By repeating the above described write-in and read-out operations, the information related to the second field F2 is read out with a vertical shift of ½ pitch of the stripe groups with respect to the information related to the first field F1. In other words, the sampling points of the sampled data which are related to the second field F2 and are read out are shifted in the vertical direction by ½ pitch of the stripe groups with respect to the sampling points of the sampled data which are related to the first field F1 and are read out. The output signals of the memories 23a and 23b are supplied to the D/A converter 16. The output signal of the D/A converter 16 is subjected to the color demodulation in the color demodulating circuit 17, and the output color signal of the color demodulating circuit 17 is obtained via the output terminal 18.

According to the third embodiment, the color multiplexed signal is obtained by performing the write-in and read-out operations so that the information related to the second field F2 is read out with the vertical shift of ½ pitch of the stripe groups with respect to the information related to the first field F1. For this reason, when one period of the stripe groups is set to correspond to one horizontal scanning period (that is, one horizontal scanning line) of the NTSC system, the scanning is substantially the same as an interlaced scanning and the vertical resolution is improved.

The vertical shift between the read-out of the information related to the second field F2 with respect to the read-out of the information related to the first field F1 is not limited to ½ pitch of the stripe groups.

In the second and third embodiments, the information is decimated in the horizontal direction and the sampling is performed with a shift of T/6 between two mutually adjacent scanning lines. However, the sampling method is not limited to those described in the embodiments. For example, the information need not be decimated in the horizontal direction, and the sampling need not be performed with a shift between two mutually adjacent scanning lines.

Figure 9A:
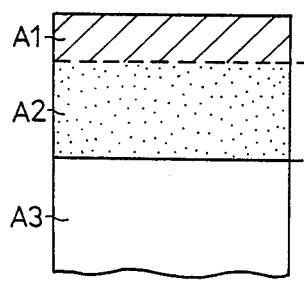
FIGS. 9A and 9B are diagrams for explaining the case where the brightness of an object picked up by the color image pickup device gradually becomes darker in the vertical direction.

Next, description will be given for a case where an object shown in FIG. 9A is to be picked up by the image pickup device. In FIG. 9A, the object has a black portion A1, a gradation portion A2 which gradually becomes darker towards the black portion A1, and a white portion A3.

Figure 9B:
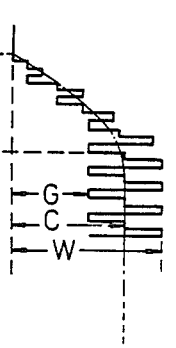

When the object shown in FIG. 9A is picked up, an output waveform of the image pickup tube becomes as shown in FIG. 9B in correspondence with the G, C and W stripes of the color stripe filter. In other words, in the gradation portion A2, a low frequency component is multiplexed in the output of the image pickup tube. For this reason, when such an output of the image pickup tube is sampled, written and read out from a memory for every one stripe group, a high frequency component multiplexed on the low frequency component in the gradation portion A2 acts as a pseudo color multiplexed signal, and there is a problem in that it is impossible to accurately reproduce the colors.

Figure 10:
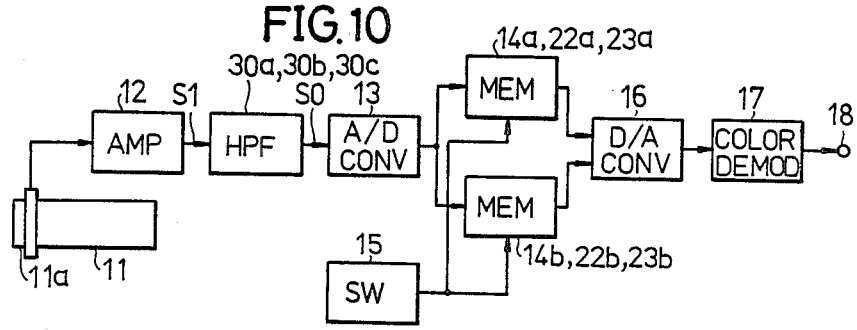
FIG. 10 is a system block diagram showing a fourth embodiment of the color image pickup device according to the present invention.

FIG. 10 shows a fourth embodiment of the color image pickup device according to the present invention in which the above described problem is eliminated. In FIG. 10, those parts which are the same as those corresponding parts in FIG. 1 are designated by the same reference numerals, and description thereof will be omitted.

Figure 11A:
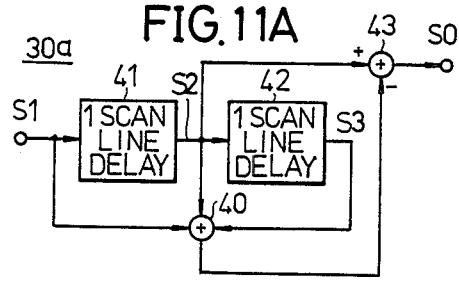
FIGS. 11A, 11B and 11C are system block diagrams respectively showing an essential part of the color image pickup device shown in FIG. 10.

In FIG. 10, the output signal of the preamplifier 12 is supplied to a highpass filter 30a having a construction shown in FIG. 11A, for example. In FIG. 11A, the output signal S1 of the preamplifier 12 supplied to an operating circuit 40 and a one scanning line delay circuit 41. An output signal S2 of the delay circuit 41 is supplied to the operating circuit 40, a subtracting circuit 43 and a one scanning line delay circuit 42. An output signal S3 of the delay circuit 42 is supplied to the operating circuit 40. The adder 40 adds the signals supplied thereto and also multiplies a coefficient ⅓. Hence, a signal $(S1+S2+S3)/3$ is produced from the operating circuit 40 and is supplied to the subtracting circuit 43. The signal $(S1+S2+S3)/3$ is an average value (low frequency component) of the output of the image pickup tube indicated by a one-dot chain line in FIG. 9B.

Figure 12:
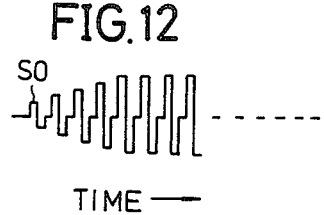
FIG. 12 shows an output signal waveform of a high-pass filter in the color image pickup device shown in FIG. 10.

The subtracting circuit 43 subtracts the signal $(S1+S2+S3)/3$ from the signal S2 and produces a signal S0 shown in FIG. 12 in which the low frequency component of the output of the image pickup tube has been eliminated. Because the low frequency component of the output of the image pickup tube is eliminated in the highpass filter 30a, the pseudo color multiplexed signal described before will not be produced in the gradation portion A2 even when the output of the image pickup tube is sampled, written and read out from the memories 14a and 14b for every one stripe group of the color stripe filter 11a. Therefore, it is possible to accurately reproduce the colors in the gradation portion A2.

Figure 11B:
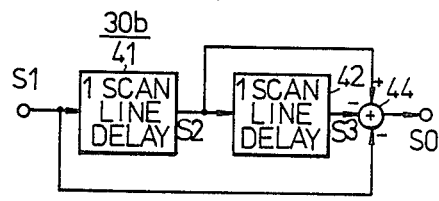

FIG. 11B shows the construction of a highpass filter 30b which may be used instead of the highpass filter 30a. In FIG. 11B, those parts which are the same as those corresponding parts in FIG. 11A are designated by the same reference numerals, and description thereof will be omitted. In FIG. 11B, a operating circuit 44 performs an operation $S0=(⅔)S2-(⅓)S1-(⅓)S3$, so as to eliminate the low frequency component.

Figure 11C:
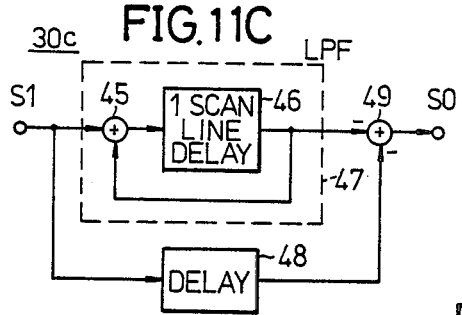

FIG. 11C shows the construction of a highpass filter 30c which may be used instead of the highpass filter 230a. In FIG. 11C, the output signal S1 of the preamplifier 12 is supplied to an adder 45. This adder 45 constitutes a lowpass filter 47 together with a one scanning line delay circuit 46. An output signal of the adder 45 is supplied to the delay circuit 46, and an output signal of the delay circuit 46 is supplied to the adder 45. The output signal of the delay circuit 46 is also supplied to a subtracting circuit 49. On the other hand, the signal S1 is passed through a delay circuit 48 and is supplied to the subtracting circuit 49. The subtracting circuit 49 performs a subtraction of the output signals of the low-pass filter 47 and the delay circuit 48, so as to eliminate the low frequency component. The delay time of the delay circuit 48 is set to a time corresponding to the delay of the lowpass filter 47.

According to the fourth embodiment, the output of the image pickup tube is subjected to the highpass filter processing on the time base which is perpendicular to the scanning direction. For this reason, when the brightness of the object which is picked up by the image pickup device gradually becomes brighter (or darker) in the vertical direction, it is possible to eliminate the low frequency component produced in the gradation portion of the object. Hence, the pseudo color multiplexed signal will not be produced in the gradation portion even when the output of the image pickup tube is sampled, written and read out from the memory. As a result, it is possible to accurately reproduce the colors of the object.

In each of the embodiments described heretofore, the television system is not limited to the NTSC system. Furthermore, the number of stripe groups is not limited to those of the embodiments.

In addition, the method of obtaining the luminance signal in the second, third and fourth embodiments is not limited to those described. As described in conjunction with FIGS. 13 and 5, it is possible to apply the methods of the first and second modifications of the first embodiment to the second through fourth embodiments. However, description thereof will be omitted because operations of such modifications of the second through fourth embodiments would be apparent to those skilled in the art.

Further, the present invention is not limited to these embodiments, but various variations and modifications may be made without departing from the scope of the present invention.

What is claimed is:

1. A color image pickup device comprising:
   an image pickup tube;
   a color stripe filter comprising a plurality of stripe groups, each stripe group comprising a plurality of stripes, said color stripe filter being arranged on said image pickup tube so that a longitudinal direction of the stripes of said color stripe filter is substantially parallel to a scanning direction of said image pickup tube;
   an analog-to-digital converter for subjecting an output of said image pickup tube to an analog-to-digital conversion;
   memory means for writing therein an output signal of said analog-to-digital converter in a sequence of data arranged in said scanning direction for every one stripe group and for reading out therefrom the stored signal in a sequence of data arranged in a direction perpendicular to said scanning direction for every one stripe group so that color components obtained via said color stripe filter are multiplexed in a sequence corresponding to a direction perpendicular to said scanning direction for every one stripe group; and
   a digital-to-analog converter for subjecting an output of said memory means to a digital-to-analog conversion so as to produce a color multiplexed signal.

2. A color image pickup device as claimed in claim 1 in which each stripe group of said color stripe filter comprises a green stripe, a cyan stripe and a transparent stripe.

3. A color image pickup device as claimed in claim 2 in which said image pickup tube has four or more scanning lines per one stripe group.

4. A color image pickup device as claimed in claim 1 which further comprises luminance signal producing means for producing a luminance signal from said color multiplexed signal.

5. A color image pickup device as claimed in claim 4 which further comprises luminance signal producing means for producing a luminance signal by cutting off frequencies of said color multiplexed signal over a frequency determined by a period of said stripe groups.

6. A color image pickup device comprising:
   an image pickup tube;
   a color stripe filter comprising a plurality of stripe groups, each stripe group comprising a plurality of stripes, said color stripe filter being arranged on said image pickup tube so that a longitudinal direction of the stripes of said color stripe filter is substantially parallel to a scanning direction of said image pickup tube;
   color multiplexed signal obtaining means for obtaining a color multiplexed signal by multiplexing color components obtained via said color stripe filter in a sequence corresponding to a direction perpendicular to said scanning direction for every one stripe group; and
   luminance signal producing means for producing a luminance signal by adding data of said color multiplexed signal for each of said stripe groups.

7. A color image pickup device as claimed in claim 6 which further comprises color demodulating means for producing a color demodulated signal by subjecting said color multiplexed signal to a color demodulation.

8. A color image pickup device comprising:
   an image pickup tube;
   a color stripe filter comprising a plurality of stripe groups, each stripe group comprising a plurality of stripes, said color stripe filter being arranged on said image pickup tube so that a longitudinal direction of the stripes of said color stripe filter is substantially parallel to a scanning direction of said image pickup tube; and
   color multiplexed signal obtaining means for obtaining a color multiplexed signal by multiplexing color components obtained via said color stripe filter in a sequence corresponding to a direction perpendicular to said scanning direction for every one stripe group,
   said color multiplexed signal obtaining means comprising memory means for shifting write-in and read-out positions thereof in a direction perpendicular to said scanning direction by a predetermined distance determined by a pitch of said stripe groups for at least every other field.

9. A color image pickup device as claimed in claim 8 in which said predetermined distance is equal to one half the pitch of said stripe groups.

10. A color image pickup device as claimed in claim 8 which further comprises luminance signal producing means for producing a luminance signal from said color multiplexed signal.

11. A color image pickup device as claimed in claim 8 which further comprises luminance signal producing means for producing a luminance signal by adding data of said color multiplexed signal for each of said stripe groups.

12. A color image pickup device as claimed in claim 8 which further comprises luminance signal producing means for producing a luminance signal by cutting off frequencies of said color multiplexed signal over a frequency determined by a period of said stripe groups.

13. A color image pickup device comprising:
   an image pickup tube;
   a color stripe filter comprising a plurality of stripe groups, each stripe group comprising a plurality of stripes, said color stripe filter being arranged on said image pickup tube so that a longitudinal direction of the stripes of said color stripe filter is substantially parallel to a scanning direction of said image pickup tube; and color multiplexed signal obtaining means for obtaining a color multiplexed signal by multiplexing color components obtained via said color stripe filter in a sequence corresponding to a direction perpendicular to said scanning direction for every one stripe group, said color multiplexed signal obtaining means comprising processing means for eliminating a low frequency component of said color multiplexed signal.

14. A color image pickup device as claimed in claim 13 which further comprises color demodulating means for producing a color demodulated signal by subjecting said color multiplexed signal to a color demodulation.

15. A color image pickup device as claimed in claim 13 in which said color multiplexed signal obtaining means further comprises an analog-to-digital converter for subjecting an output of said processing means to an analog-to-digital conversion, memory means for writing therein an output signal of said analog-to-digital converter in a sequence of data arranged in said scanning direction for every one stripe group and for reading out therefrom the stored signal in a sequence of data arranged in a direction perpendicular to said scanning direction for every one stripe group, and a digital-to-analog converter for subjecting an output of said memory means to a digital-to-analog conversion so as to produce the color multiplexed signal.

16. A color image pickup device as claimed in claim 13 which further comprises luminance signal producing means for producing a luminance signal from said color multiplexed signal.

17. A color image pickup device as claimed in claim 16 which further comprises luminance signal producing means for producing a luminance signal by adding data of said color multiplexed signal for each of said stripe groups.

18. A color image pickup device as claimed in claim 16 which further comprises luminance signal producing means for producing a luminance signal by cutting off frequencies of said color multiplexed signal over a frequency determined by a period of said stripe groups.

* * * * *